S. L. CONDÉ.
FULCRUM ATTACHMENT FOR FORKS AND SPADES.
APPLICATION FILED SEPT. 1, 1908.
931,387.
Patented Aug. 17, 1909.
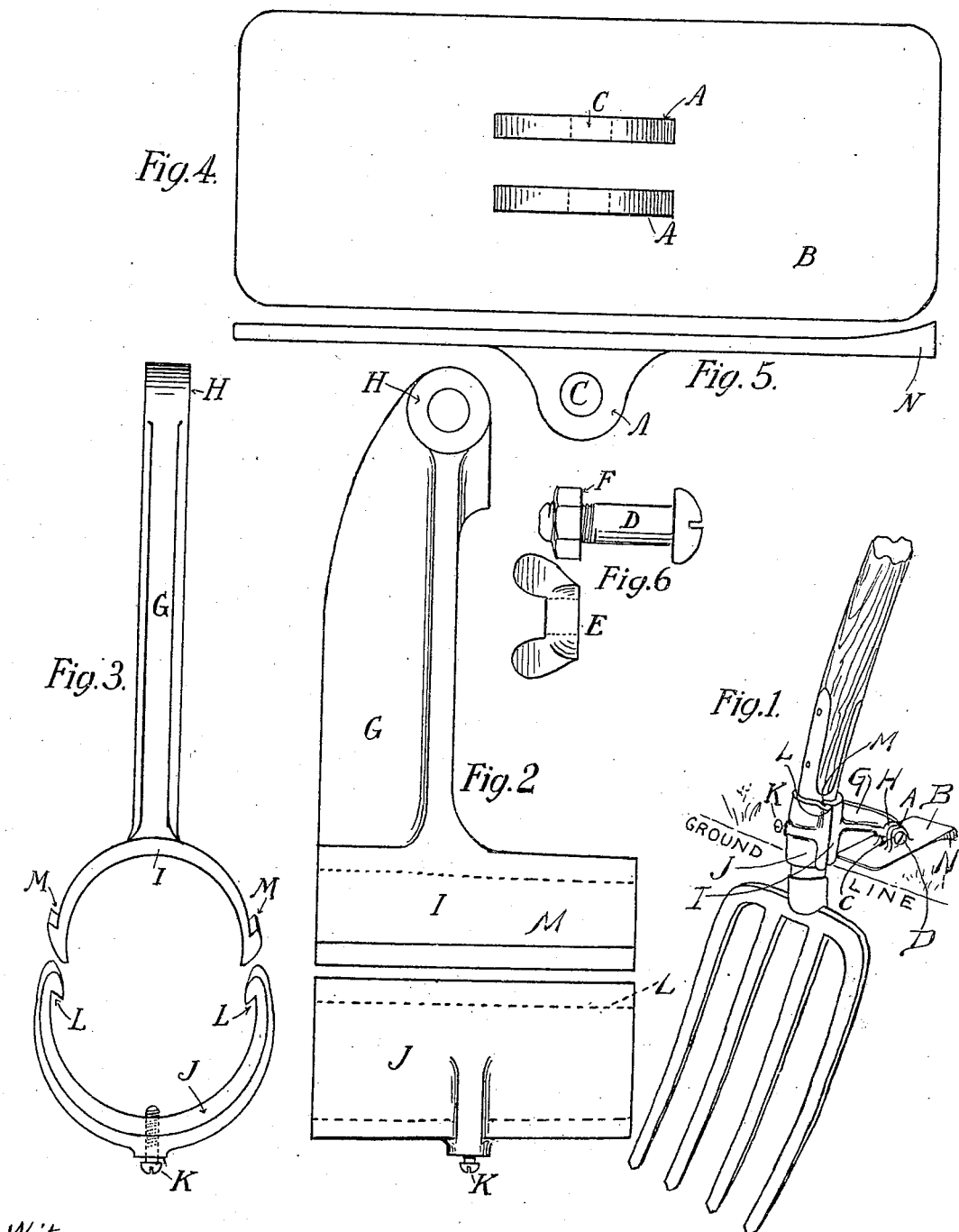
Witnesses
Inventor
Samuel L. Condé.
by
Attorney.

UNITED STATES PATENT OFFICE.

SAMUEL L. CONDÉ, OF CLEVELAND, OHIO, ASSIGNOR TO BERTHA CONDE, OF CLEVELAND, OHIO.

FULCRUM ATTACHMENT FOR FORKS AND SPADES.

No. 931,387.      Specification of Letters Patent.      Patented Aug. 17, 1909.

Application filed September 1, 1908. Serial No. 451,232.

*To all whom it may concern:*

Be it known that I, SAMUEL L. CONDÉ, citizen of the United States, residing at Cleveland, in the county of Cuyahoga and State of Ohio, have invented certain new and useful Improvements in Fulcrum Attachments for Forks and Spades, of which the following is a specification.

The object of this invention is to form an attachment for forks, spades, shovels and the like, which will relieve the strain upon the person using it in digging potatoes, spading, etc., the stress being on the attachment which serves as a fulcrum for the handle of the equipment.

The invention is illustrated in the accompanying drawings, in which;

Figure 1 is a perspective view of the fork and attachment in use. Fig. 2 is a side view of the arm forming part of the device. Fig. 3 is a top view of the same. Fig. 4 is a top view of a shoe to which the arm is pivoted. Fig. 5 is a side view of a shoe upside down. Fig. 6 is a side view of fulcrum bolt.

Referring specifically to the several drawings, G represents the fulcrum arms pivoted at one end H to ears A A of shoe B at holes C by a bolt D having a nut F or wing nut E. The shoe B has a curved thickened end N which prevents shoe from slipping, and from cutting into the ground.

The arm G is secured to the fork head or handle by means of a clamp consisting of semitubular parts or clamp sections I and J, the former being integral with the arm G. One of these parts, I, has outwardly-projecting hooks M along the edge thereof, and the other part J, has inwardly-projecting hooks L along its edges, and when the parts are assembled in the fork handle, these hooks engage each other and fasten the parts together to form the clamp. The clamping action is effected by a screw K which extends through the section J and bears against the handle, or preferably against the metal socket of the fork head.

The attachment is fastened to the handle of the implement just above the head of the fork or blade, and in use the shoe will, when the fork is driven into the ground, come in contact with the ground, and the work will when the handle is pressed down, turn on the bolt D as a fulcrum, giving a powerful leverage for the intended purpose.

The clamp and other parts of the attachment may be modified in various ways, and the device may be used on other implements than those named, hence no limitation in this respect is implied.

I claim:

A fulcrum attachment for forks and similar implements, comprising a clamp adapted for attachment to the handle of the implement, and consisting of two members connected together, one member having a rigid arm projecting rearwardly from the same, and a shoe at the rear end of the arm consisting of a plate arranged to lie flatly on the ground and having a thickened part at one end and a pivotal connection at about the middle of its upper side with the end of the arm.

In testimony whereof, I affix my signature in presence of two witnesses.

SAMUEL L. CONDÉ.

Witnesses:
     JOHN A. BOMMHARDT,
     MONROE E. MILLER.